United States Patent
Azima et al.

[11] Patent Number: 6,031,926
[45] Date of Patent: Feb. 29, 2000

[54] PANEL-FORM LOUDSPEAKERS

[75] Inventors: Henry Azima, Cambridge; Martin Colloms, London; Neil John Harris, Great Shelford, all of United Kingdom

[73] Assignee: New Transducers Limited, London, United Kingdom

[21] Appl. No.: 09/029,360

[22] PCT Filed: Sep. 2, 1996

[86] PCT No.: PCT/GB96/02162

§ 371 Date: Jul. 8, 1998

§ 102(e) Date: Jul. 8, 1998

[87] PCT Pub. No.: WO97/09846

PCT Pub. Date: Mar. 13, 1997

Related U.S. Application Data

[63] Continuation-in-part of application No. 08/707,012, Sep. 3, 1996.

[51] Int. Cl.[7] .................................................. H04R 25/00
[52] U.S. Cl. ............................ 381/423; 381/398; 381/429
[58] Field of Search ..................................... 381/190, 191, 381/396, 398, 431, 429, 423

[56] References Cited

U.S. PATENT DOCUMENTS

| | | | |
|---|---|---|---|
| 4,751,419 | 6/1988 | Takahata | 310/324 |
| 5,025,474 | 6/1991 | Tanaka et al. | 181/160 |
| 5,748,758 | 5/1998 | Menasco, Jr. et al. | 381/176 |
| 5,838,805 | 11/1995 | Warnaka et al. | 381/190 |

FOREIGN PATENT DOCUMENTS

| | | | |
|---|---|---|---|
| 2010637 | 11/1978 | United Kingdom | H04R 7/06 |
| 2246684 | 4/1990 | United Kingdom . | |

*Primary Examiner*—Curtis A. Kuntz
*Assistant Examiner*—Dionne N. Harvey
*Attorney, Agent, or Firm*—Foley & Lardner

[57] ABSTRACT

A panel-form loudspeaker has two distributed mode acoustic radiators coupled by a resilient suspension. Each radiator has its own transducer.

6 Claims, 7 Drawing Sheets

PANEL-FORM LOUDSPEAKERS

This application is a continuation-in-part of application Ser. No. 08/707,012, filed Sept. 3, 1996.

TECHNICAL FIELD

The invention relates to loudspeakers and more particularly to loudspeakers comprising panel-form acoustic radiating elements.

BACKGROUND ART

It is known from GB-A-2262861 to suggest a panel-form loudspeaker comprising:

a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;

a mounting means which supports the panel or attaches to it a supporting body, in a free undamped manner;

and an electro-mechanical drive means coupled to the panel which serves to excite a multi-modal resonance in the radiator panel in response to an electrical input within a working frequency band for the loudspeaker.

U.S. Pat. No. 3,247,925 of WARNAKA discloses what purports to be a low frequency resonant panel loudspeaker mounted in a chassis and excited by an electromechanical transducer mounted on the chassis.

DISCLOSURE OF INVENTION

Embodiments of the present invention use members of nature, structure and configuration achievable generally and/or specifically by implementing teachings of our co-pending application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of loudspeakers. Members as above are herein called distributed mode acoustic radiators and are intended to be characterised as in the above co-pending parent application and/or otherwise as specifically provided herein.

The invention is a panel-form loudspeaker having a member comprising a stiff lightweight panel having capability to sustain and propagate input vibrational energy by bending waves in at least one operative area extending transversely of thickness to have resonant mode vibration components distributed over said at least one area and have predetermined preferential locations or sites within said area for transducer means and having first and second transducers mounted on said member at two of said locations or sites to vibrate the member to cause it to resonate forming an acoustic radiator which provides an acoustic output when resonating. The first and second, transducers may be adapted to operate in different frequency ranges. The radiator may have a cellular core sandwiched between skins. The loudspeaker may comprise a frame supporting the radiator, and a resilient suspension by which the radiator is attached to the frame. The frame may surround the radiator, and the suspension may be attached to the edge of the radiator. The first and second transducers may be mounted wholly and exclusively on the radiator. One of the transducers may be electromagnetic. One of the transducers may be piezoelectric. The panel-form loudspeaker may comprise a second member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted on said member at one of said locations or sites to vibrate the member to cause it to resonate forming an acoustic radiator which provides an acoustic output when resonating, the second member being mounted on or in the first said member, and a resilient suspension coupling the first and second members. The second member may be mounted in an aperture in the first member. The second transducer may be mounted wholly and exclusively on the second member.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
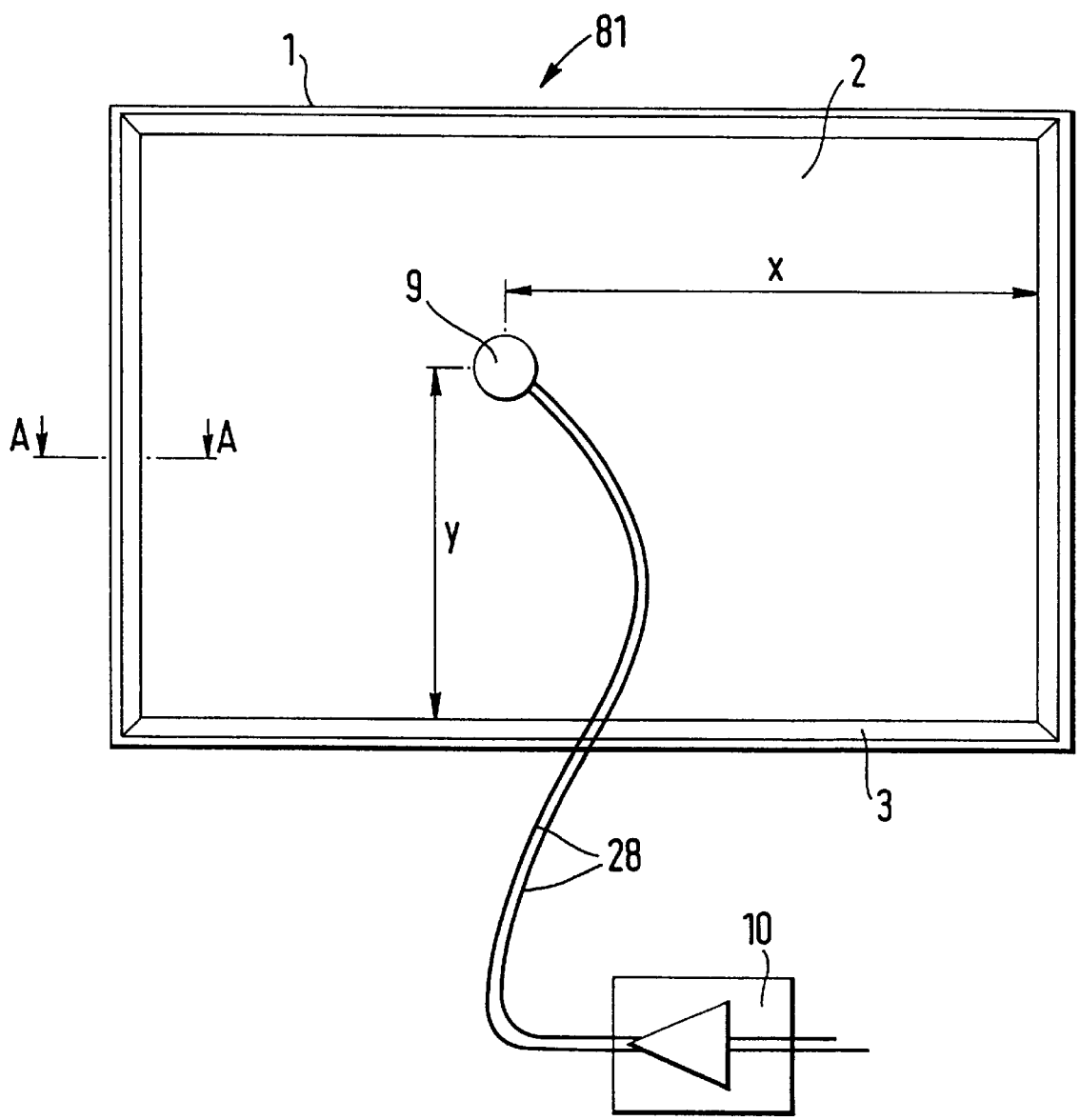
FIG. 1 is a diagram showing a distributed-mode loudspeaker as described and claimed in our co-pending application No. 08/707,012.

Referring to FIG. 1 of the drawings, there is shown a panel-form loudspeaker (81) of the kind described and claimed in our co-pending application No. 08/707,012 comprising a rectangular frame (1) carrying a resilient suspension (3) round its inner periphery which supports a distributed mode sound radiating panel (2). A transducer (9) e.g as described in detail with reference to our co-pending application Ser. Nos. 09/011,773, 09/011,770 and 09/011,831 is mounted wholly and exclusively on or in the panel (2) at a predetermined location defined by dimensions x and y, the position of which location is calculated as described in our co-pending application Ser. No. 08/707,012, to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
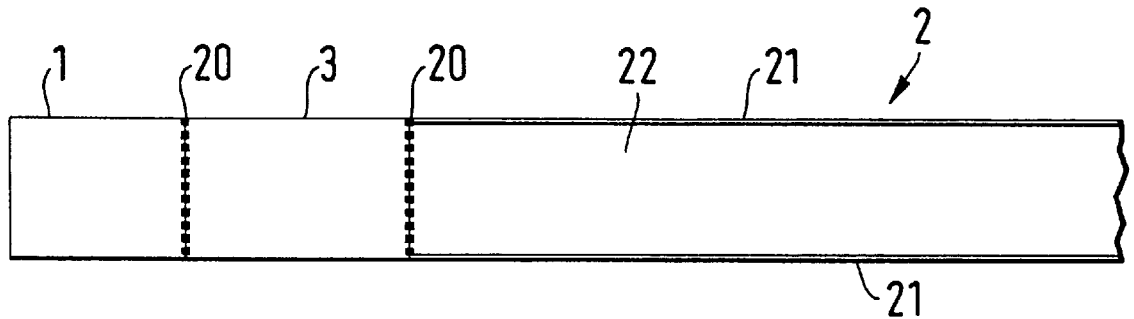
FIG. 2a is a partial section on the line A—A of FIG. 1.
Figure 2B:
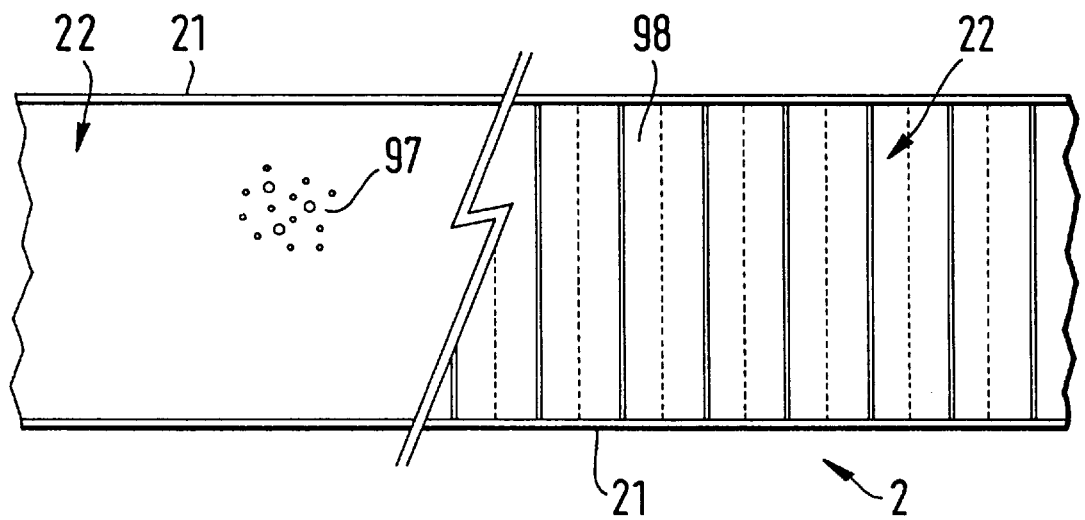
FIG. 2b is an enlarged cross-section through a distributed mode radiator of the kind shown in FIG. 2a and showing two alternative constructions.
Figure 3:
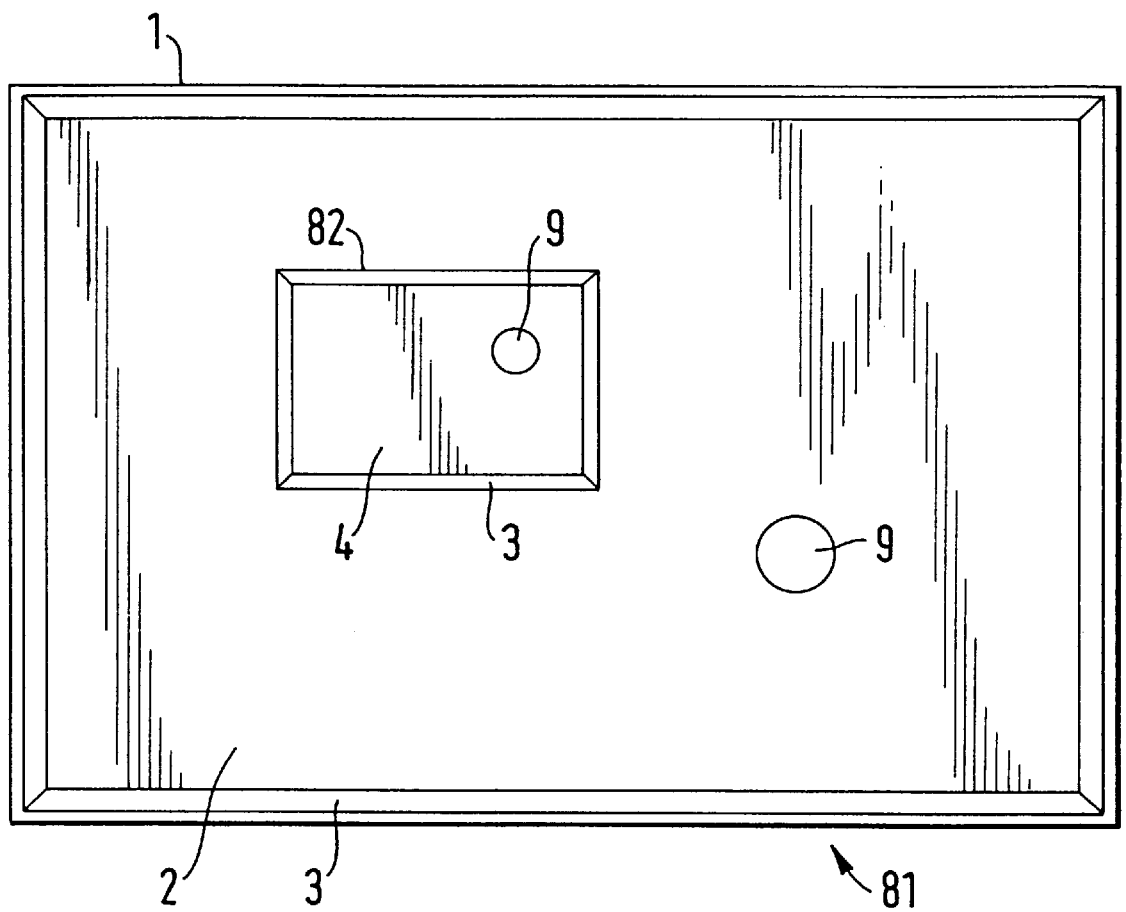
FIG. 3 is a diagram of a first embodiment of distributed-mode loudspeaker according to the present invention.
Figure 4:
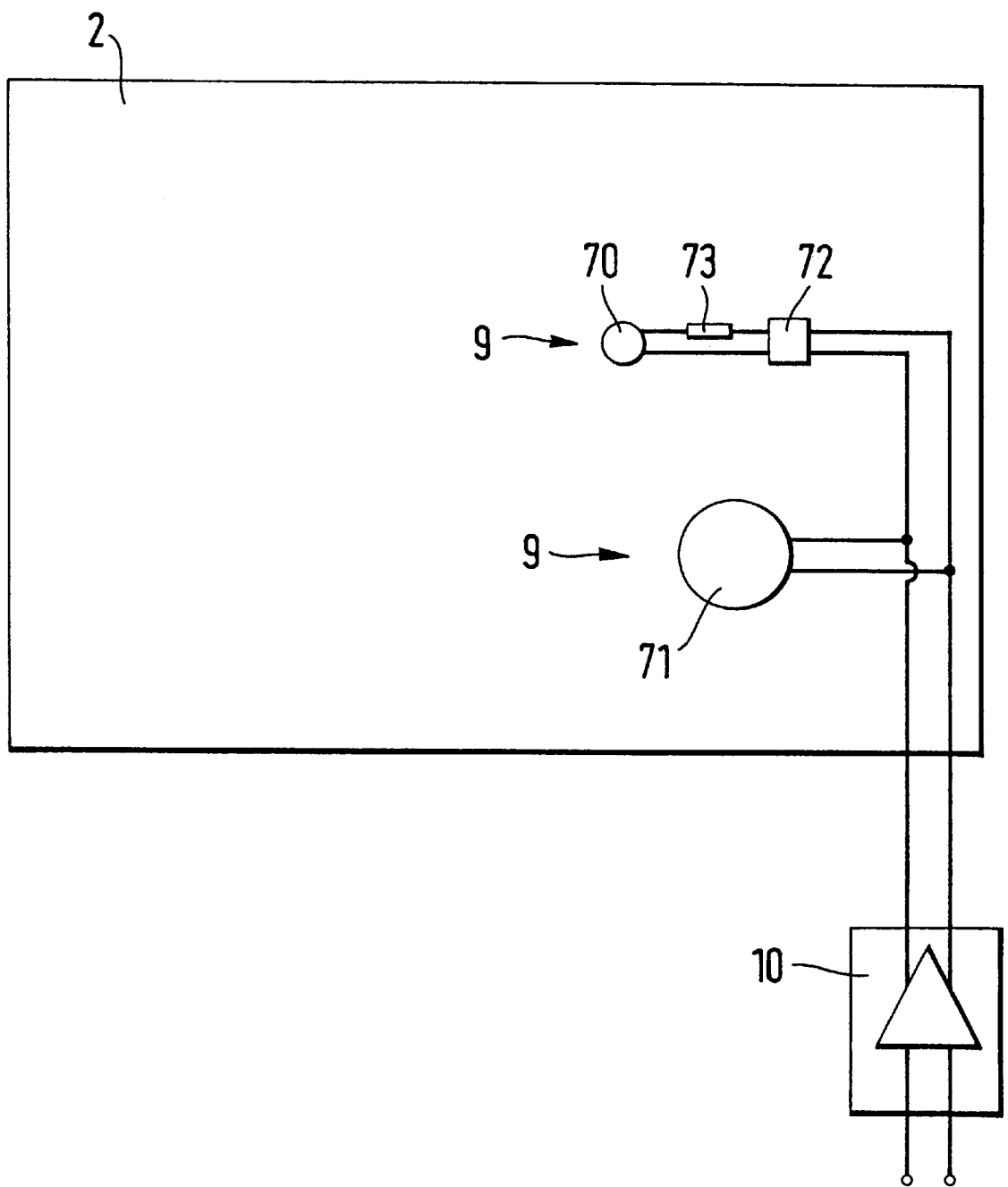
FIG. 4 is a diagram of a second embodiment of distributed mode loudspeaker according to the invention.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 meter distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bidirectional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound shown in our co-pending application Ser. Nos. 09/011,773, 09/011,770, and 09/011,831; and The transducers (70,71) are driven by an amplifier (10) coupled in parallel to the respective transducers with the interposition of a step-up transformer (72) and matching resistance (73) in the line to the piezo transducer in view of its relatively high voltage requirement. If desired more than one transducer (70) and/or transducer (71) may be provided to improve the performance.

Figure 5:
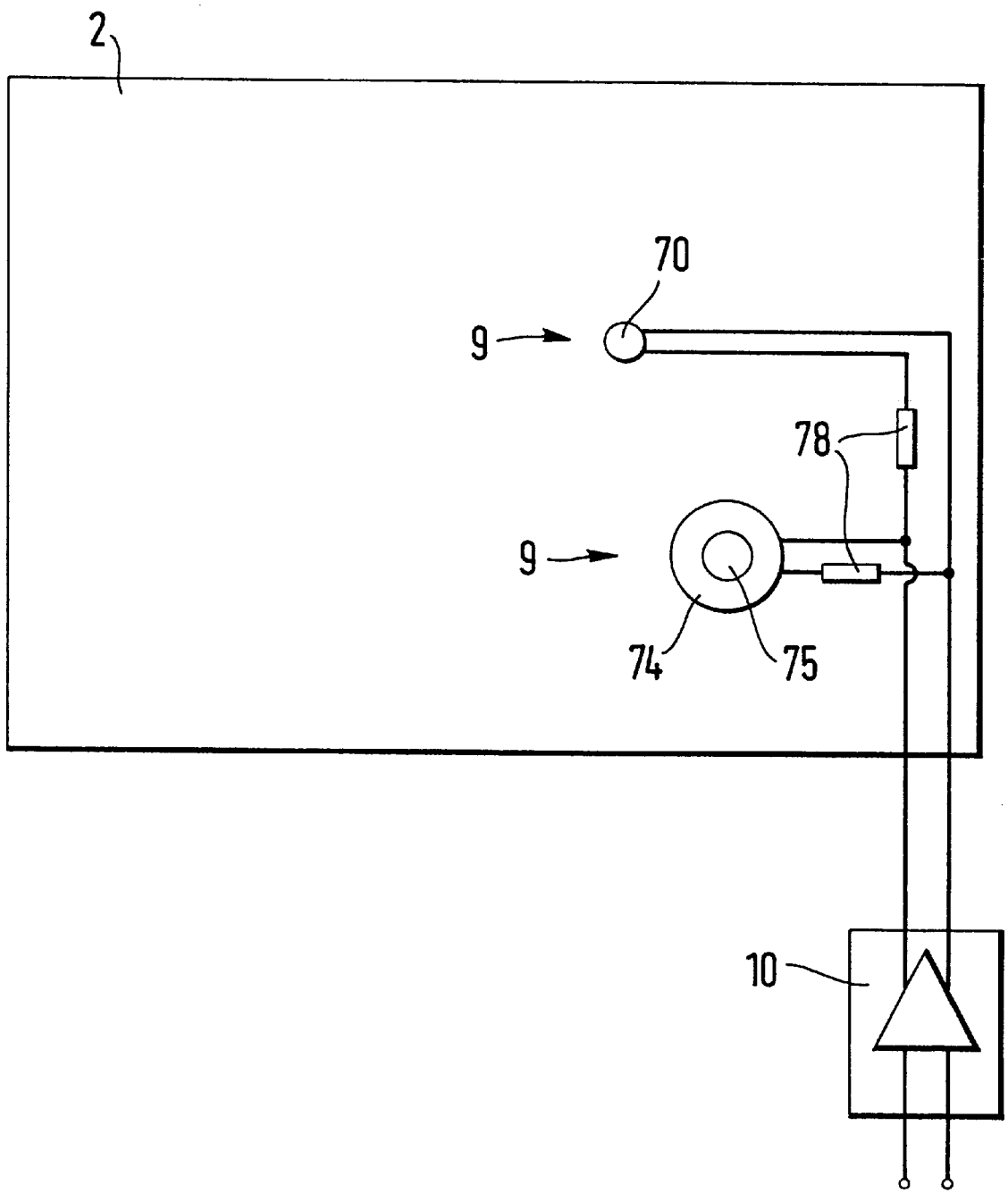
FIG. 5 is a diagram of a third embodiment of distributed mode loudspeaker according to the invention.
Figure 7:
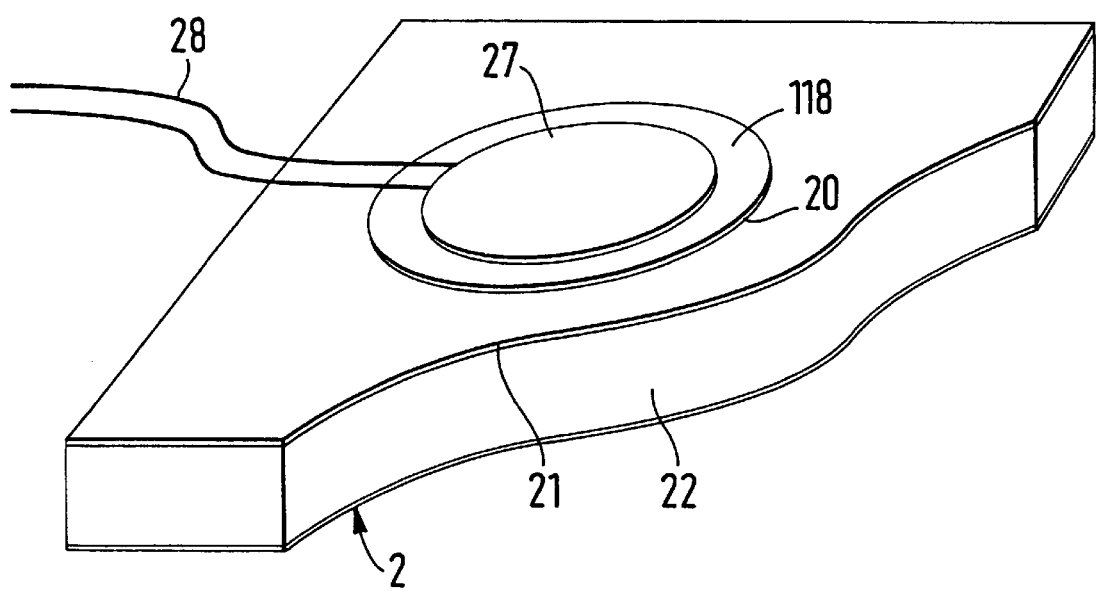
FIG. 7 is a perspective diagram of a transducer.

FIG. 5 illustrates how a distributed mode panel (2) according to the present invention, e.g. of the kind shown in FIGS. 1 and 2, can be driven by a pair (70,74) of transducers (9), the transducer (70) being a high frequency piezo-electric transducer e.g. of the kind shown in FIG. 7 and the transducer (74) being a low frequency piezo-electric transducer of the kind shown in our co-pending application Ser. No. 09/011,770. Reference (75) indicates that the transducer (74) is weighted with a mass to increase its inertia. The transducers (70,74) are driven by an amplifier (10) to which they are connected in parallel, with resistors (78) interposed to provide a frequency dividing network. If desired more than one transducer (70) and/or transducer (74) may be provided to improve the performance.

Figure 6:
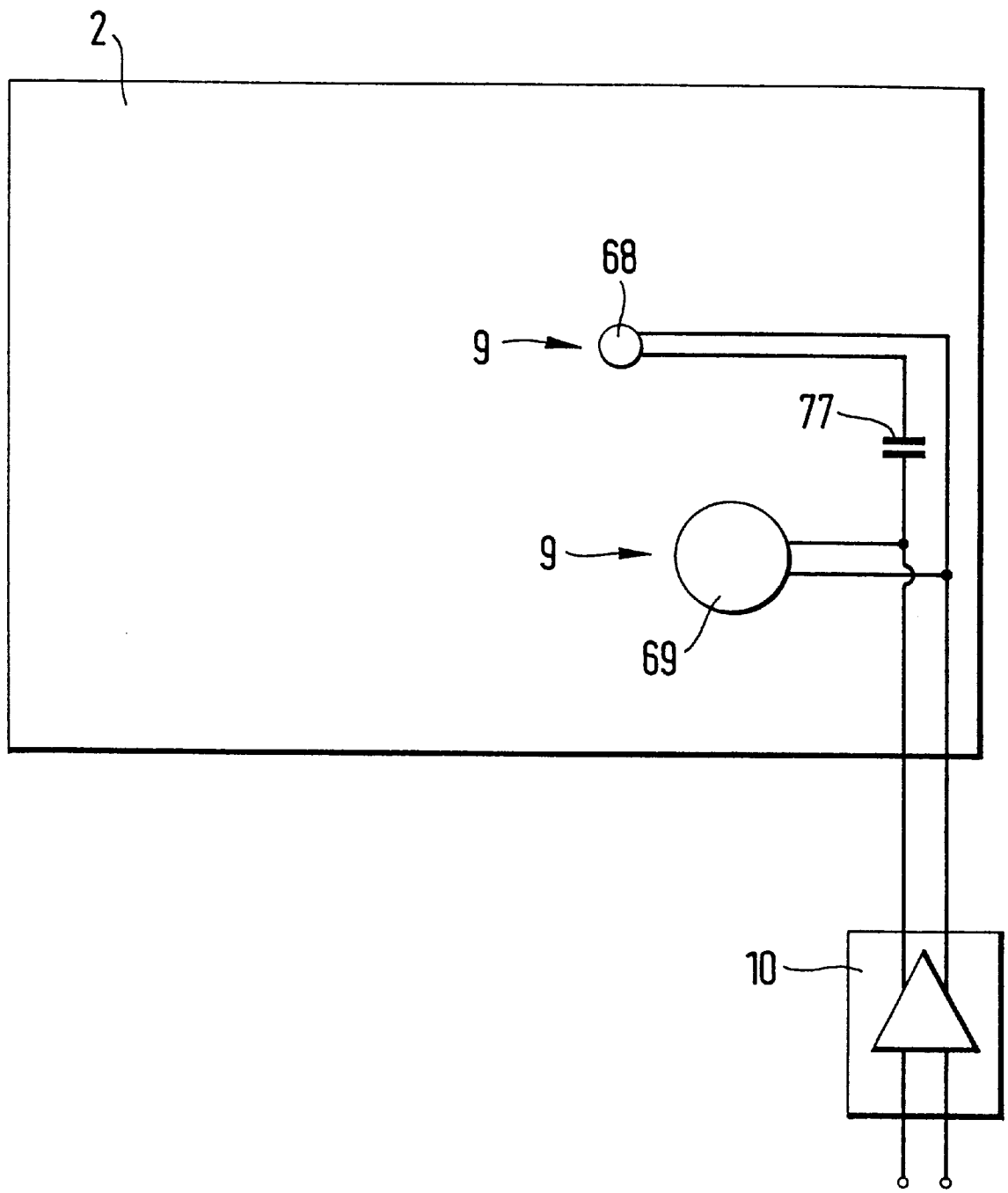
FIG. 6 is a diagram of a fourth embodiment of distributed mode loudspeaker according to the invention.

FIG. 6 illustrates how a distributed mode panel (2) according to the present invention, e.g. of the kind shown in FIGS. 1 and 2, can be driven by a pair (68,69) of electrodynamic transducers, e.g. of the kinds shown in our co-pending application Ser. Nos. 09/011,773, 09/011,770, and 09/011,831.

The transducer (68) is intended as a high frequency driver and is thus of low inductance, whereas the transducer (69) is intended as a low frequency driver and is of high inductance.

The transducers (68,69) are driven in parallel by an amplifier (10) with a capacitor (77) in the line to the transducer (68) to act as a frequency divider to pass most of the high frequency signal to the transducer (68). If desired more than one transducer (68) and/or transducer (69) may be provided to improve the performance.

FIG. 7 shows a transducer (9) for a distributed mode panel (2) in the form of a crystalline disc-like piezo bender (27) mounted on a disc (118), e.g. of brass, which is bonded to a face of the panel (2), e.g. by an adhesive bond (20). In operation an acoustic signal applied to the transducer (9) via leads (28) will cause the piezo disc (27) to bend and thus locally resiliently deform the panel (2) to launch bending waves into the panel.

What is claimed is:

1. A panel-form loudspeaker (81) comprising:

a first member (2);

a second member (4);

a resilient suspension (3) coupling said first and second members;

each of said members (2,4) comprising a stiff lightweight panel having capability to sustain and propagate input vibrational energy by bending waves in at least one operative area extending transversely of thickness to have resonant mode vibration components distributed over said at least one area and have predetermined preferential locations or sites within said area for transducers (9);

a first transducer (9) mounted on said first member (2) at one of said locations or sites to vibrate said first member to cause it to resonate forming an acoustic resonator which provides an acoustic output when resonating; and a second transducer (9) mounted on said second member (4) at one of said locations or sites to vibrate said second member to cause it to resonate forming an acoustic resonator which provides an acoustic output when resonating.

2. A panel-form loudspeaker according to claim 1, wherein the second member (4) is mounted in an aperture (82) in the first member (2).

3. A panel-form loudspeaker according to claim 1, wherein the second transducer is mounted wholly and exclusively on the second member (4).

4. A panel-form loudspeaker according to claim 2, wherein said resilient suspension (3) is attached to the edge of said second member (4) and the edge of the aperture (82) in said first member (2).

5. A panel-form loudspeaker according to claim 4, wherein said transducers (9) are mounted wholly and exclusively on their respective members (2, 4).

6. A panel-form loudspeaker according to claim 5, wherein said first and second transducers (9) are adapted to operate in different frequency ranges.

* * * * *